UNITED STATES PATENT OFFICE.

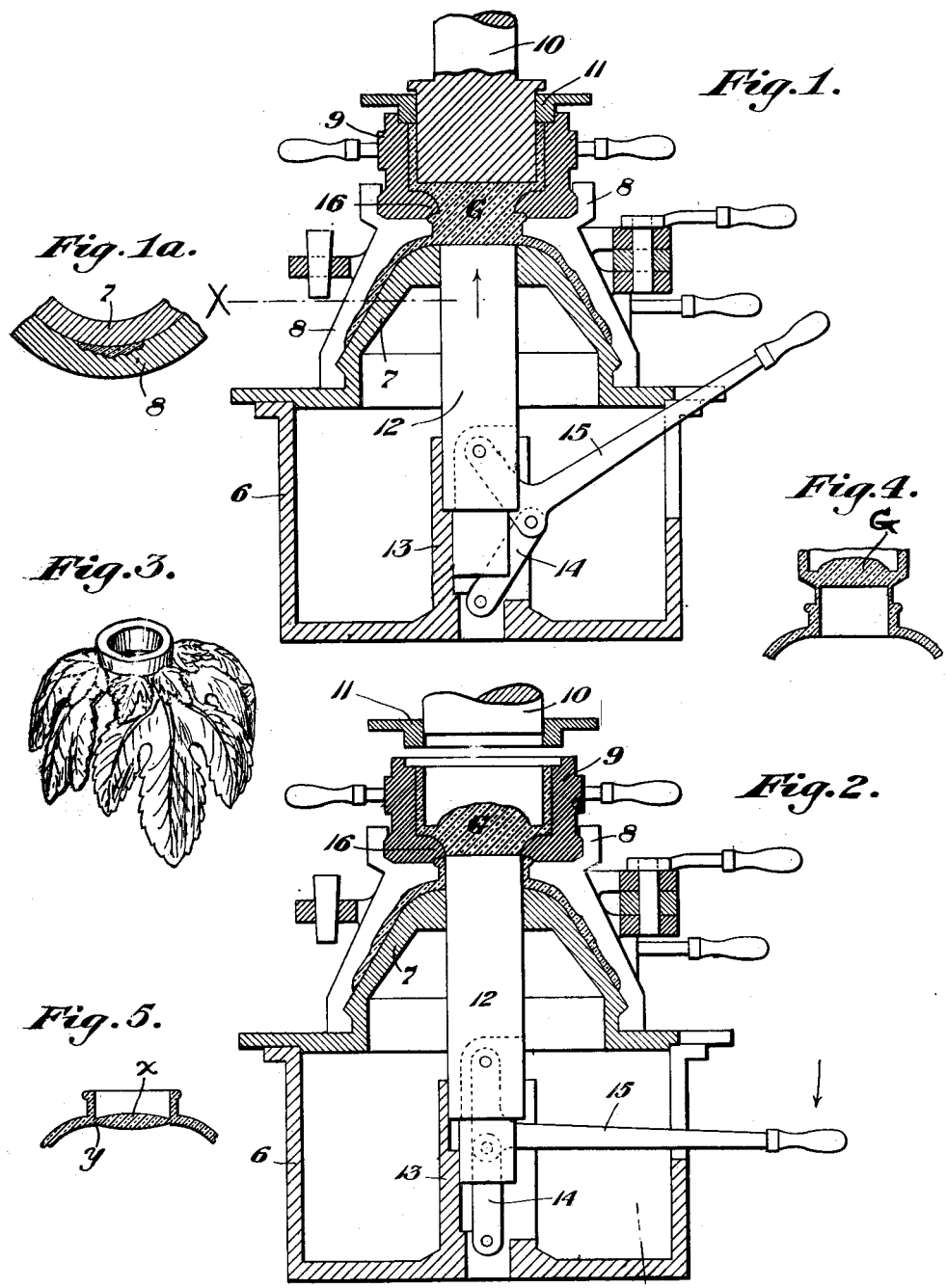

THEODORE C. STEIMER, OF DORMONT, PENNSYLVANIA.

PROCESS FOR PRESSING GLASS ARTICLES.

1,125,760.  Specification of Letters Patent.  Patented Jan. 19, 1915.

Application filed November 2, 1908. Serial No. 460,649.

*To all whom it may concern:*

Be it known that I, THEODORE C. STEIMER, a citizen of the United States, residing at Dormont, in the county of Allegheny, State of Pennsylvania, have invented a certain new and useful Process for Pressing Glass Articles, of which the following is a specification.

My invention relates to the art of making hollow articles of glass or similar material in a press mold; its primary object being to produce an article having both ends open, finished complete in the mold itself.

Another object is to provide for efficiently forcing the glass into interstices of the mold through a large opening, and yet make it easy to remove the surplus glass.

Still other objects will hereinafter appear.

I have illustrated the process in the accompanying drawing showing a simple form of mold adapted for practising the same and designed to entirely separate the surplus of glass after forming the article.

Figure 1 is a central vertical section of the mold showing an article like a lamp-shade being pressed therein, and Fig. 2 is a similar section with the parts of the mold in a different position, to finish the process. Fig. 1ᵃ is a partial cross-section on the dotted line (X) in Fig. 1, and Fig. 3 is a perspective sketch of a lamp-shade finished as it comes from the mold. Fig. 4 illustrates a modification of the process, and Fig. 5 illustrates one of the practices in the prior art.

It has heretofore been very difficult to press an article with one open end in a mold and leave it in such condition as to make it feasible to cheaply provide another opening. In making a lamp-shade for example, it was necessary to form the article in a dished-shape with no opening at the bottom, but the glass was weakened by being made very thin at the point *y*, illustrated in Fig. 5, so that after removal from the mold the block of extra glass X could be knocked out after which the broken and ragged edge was made smooth by an additional operation, generally by grinding. That is, it has not been possible heretofore to press in a mold an article of a general ring form with two openings. The best that could be done was to make such an article as a lamp-shade for example, in the form shown in Fig. 5, and even in this it was absolutely necessary to press downward so that the gravity assisted in flowing the glass through the narrow space at *y* into the main body of the mold. It is believed such an article as shown in Fig. 3, could not have been made at all by flowing the glass through such a narrow opening, as it would be practically impossible to force the glass into the small cavities and depressions of the mold quickly enough, without causing crinkling.

In my process, the article is first formed by pressing the glass downward from a large body of glass with the greatest possible opening, and then the surplus glass is removed and an opening made before removal from the mold and while the glass is still soft. Thus in the drawings, I have shown a mold in which there is a stationary former 7 mounted upon the base 6 and upon this neatly fit several sections 8, 8, of a separable mold. The sections 8 have cut into their surfaces depressions for forming the article, (such as shown in Fig. 3) and where there are to be open spaces, of course the entire body of the article is to be formed by these depressions in part 8, the intermediate surfaces of the mold 8 between openings fitting the former 7 closely. The sections 8 are open on top of the mold, and according to the usual custom, I use a glass retaining ring 9, in which the charge of metal is placed, and any convenient plunger 10 enters therein, being made to fit neatly in place by means of the ring 11.

As the plunger descends to the position shown in Fig. 1 the large mass of glass G is forced down and fills all the interstices of the mold, it thus flowing full through the central body portion. The plunger being now raised, as indicated in Fig. 2, the central opening for the bottom of the article is made by the motion of the punching or cutting plunger 12 which has bearings in the male mold 7 and a guide stud 13 on the base 6, and is operated powerfully by means of a toggle link 14 and the bell-crank lever 15, as will be plain from the drawing. The plunger 12 is here shown as neatly fitting the cutting edges 16 of the ring 9, so that the opening is made complete and clean in final form, and the excess mass of glass G is entirely separated from the article. The article is removed from the mold in complete and finished form. Otherwise I of course may make the plunger 12 a little smaller, which will leave a slight neck on the article as shown in Fig. 4, and it will be understood that this may be readily cracked off and ground and smoothed in order to finish the article as in the former practice. The glass has thus, however, already been flowed into the mold not through the narrow neck but through the full opening.

The advantages of this process will be readily apparent to those familiar with the art and it will of course be understood that I am not limited to the mold remaining stationary, and the cutting plunger moving, nor to any particular mechanism for accomplishing the purpose of my method. The flowing of the glass into the recesses of the mold through a large opening and flowing downward, makes it possible to form in a mold delicate and intricate patterns of articles which never have heretofore been made. The separation of the surplus glass from the article itself while still in the mold does away with all the supplementary processes of cracking off and removing parts of the article after it is taken from the mold. In short, the process enables the production of an open ended article in a press mold in complete and final form, all its surfaces being finished.

Having thus described my invention and illustrated its use, what I claim as new and desire to secure by Letters Patent, is the following:

1. The process of forming a glass article with a central opening by first pressing the entire article with a solid center from a font and then cutting an opening in the center while the article remains in place in the mold.

2. The process of making open center glass articles by pressing molten glass from a full font into a closed mold, and afterward cutting out an opening in the article while the glass forming the article is still entirely in contact with the mold.

3. The process of forming an open center glass article by pressing it first in its general form with a solid center, meanwhile flowing the glass downward from said solid center, and then cutting a central opening by means of a movable part of the mold and before removal from the mold.

4. The process of making hollow glass articles with an open center or stem, which comprises pressing the article downward from a full font in the center of the article, and afterward punching out and completely cutting off the surplus glass in the center and thereby forming a central opening with its entire surface in contact with the mold.

5. The method of forming hollow glass articles with a hollow base or stem, consisting in forcing glass from a font around and over a stationary core, and simultaneously forming a solid base between the font and article, and then forcing a plunger through the core and the solid base, to form the hollow base or stem.

6. The method of forming a hollow glass article with a hollow stem or base, consisting in feeding the glass into a font, forcing the glass from the font and over a stationary core, and then forcing a plunger through the core and into the solid base portion between the article and the font to form a hollow base or stem.

7. The method of forming hollow glass articles consisting in forcing the glass from the font into a mold having a stationary core with a central core movable through it and then forcing the central core into the portion of glass between the stationary core and the font.

8. The method of forming hollow glass articles consisting in forcing the glass from a font into a mold having a stationary core with a central core movable through it and then forcing the central core into the portion of glass between the stationary core and the font, simultaneously substantially severing the article from the glass in the font.

In testimony whereof I have hereunto signed my name in the presence of the two subscribed witnesses.

THEODORE C. STEIMER.

Witnesses:
F. W. H. CLAY,
CHAS. S. LEPLEY.